US011151315B1

(12) United States Patent
Reyes et al.

(10) Patent No.: US 11,151,315 B1
(45) Date of Patent: Oct. 19, 2021

(54) AUTOMATICALLY DEFINING GROUPS IN DOCUMENTS

(71) Applicant: MicroStrategy Incorporated, Vienna, VA (US)

(72) Inventors: Benjamin Reyes, Great Falls, VA (US); Abhijeet Roy, South Riding, VA (US); Atul Sharma, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 16/401,924

(22) Filed: May 2, 2019

Related U.S. Application Data

(60) Provisional application No. 62/665,766, filed on May 2, 2018.

(51) Int. Cl.
  *G06F 40/197* (2020.01)
  *G06F 3/0484* (2013.01)
  (Continued)

(52) U.S. Cl.
  CPC .......... *G06F 40/197* (2020.01); *G06F 3/0484* (2013.01); *G06F 16/29* (2019.01);
  (Continued)

(58) Field of Classification Search
  None
  See application file for complete search history.

(56) References Cited

U.S. PATENT DOCUMENTS

| 6,204,844 B1 * | 3/2001 | Fumarolo | H04W 4/029 715/736 |
| 6,477,387 B1 * | 11/2002 | Jackson | H04W 84/08 455/508 |

(Continued)

OTHER PUBLICATIONS

Balakrishnan, Dineshbalu, Amiya Nayak, Pulak Dhar, and Shailesh Kaul. "Efficient geo-tracking and adaptive routing of mobile assets." In 2009 11th IEEE International Conference on High Performance Computing and Communications, pp. 289-296. IEEE, 2009. (Year: 2009).*

(Continued)

*Primary Examiner* — Frank D Mills
(74) *Attorney, Agent, or Firm* — Fish & Richardson P.C.

(57) ABSTRACT

Methods, systems, and apparatus, including computer programs encoded on a computer storage medium, for automatically defined groups for document distribution are disclosed. In one aspect, a method includes the actions of accessing document data for a document having content that is adjustable based on geographic locations of objects. The actions further include determining multiple object types specified by the document data, the multiple object types indicating types of objects that are discoverable using the document. The actions further include obtaining object location data indicating locations associated with objects. The actions further include identifying objects having the determined object types that are associated with locations in a particular geographical area. The actions further include obtaining attributes of the identified objects from one or (Continued)

more databases. The actions further include generating a view of the document based on the document data, the identified objects, and the obtained attributes.

20 Claims, 7 Drawing Sheets

(51) Int. Cl.
    *G06Q 10/08*     (2012.01)
    *G06F 16/29*     (2019.01)
    *G01S 19/13*     (2010.01)

(52) U.S. Cl.
    CPC .......... *G06Q 10/0836* (2013.01); *G01S 19/13* (2013.01); *G06F 3/04842* (2013.01)

(56) References Cited

U.S. PATENT DOCUMENTS

| | | |
|---|---|---|
| 6,661,340 B1 | 12/2003 | Saylor |
| 7,356,840 B1 | 4/2008 | Bedell |
| 8,127,326 B2 | 2/2012 | Claussen |
| 8,522,192 B1 | 8/2013 | Avalos |
| 8,732,853 B1 | 5/2014 | Byrne |
| 8,775,807 B1 | 7/2014 | Vazquez |
| 8,886,128 B2 | 11/2014 | Hubner |
| 9,027,099 B1 | 5/2015 | Saylor |
| 9,098,803 B1 | 8/2015 | Todd et al. |
| 9,160,727 B1 | 10/2015 | Saylor |
| 9,172,699 B1 | 10/2015 | Vazquez |
| 9,245,433 B1 | 1/2016 | Butler |
| 9,413,794 B1 | 8/2016 | Saylor |
| 10,257,179 B1 | 4/2019 | Saylor et al. |
| 10,382,282 B1 | 8/2019 | Levy-Yurista et al. |
| 2003/0101201 A1 | 5/2003 | Saylor |
| 2003/0139179 A1 | 7/2003 | Fuchs |
| 2005/0242946 A1 | 11/2005 | Hubbard, Jr. |
| 2006/0223518 A1 | 10/2006 | Haney |
| 2006/0265266 A1 | 11/2006 | Chen |
| 2007/0054739 A1 | 3/2007 | Amaitis |
| 2008/0086509 A1* | 4/2008 | Wallace ................. G06Q 10/10 |
| 2008/0319768 A1 | 12/2008 | Kreiner |
| 2009/0046677 A1 | 2/2009 | Toledano |
| 2009/0132941 A1* | 5/2009 | Pilskalns ............. G06F 16/9537 715/764 |
| 2009/0191898 A1 | 7/2009 | Lewis |
| 2009/0319181 A1 | 12/2009 | Khosravy |
| 2010/0019921 A1 | 1/2010 | Kreiner |
| 2010/0062758 A1 | 3/2010 | Proctor, Jr. |
| 2010/0063889 A1 | 3/2010 | Proctor, Jr. |
| 2010/0146078 A1 | 6/2010 | Wolff |
| 2011/0037712 A1 | 2/2011 | Kim |
| 2011/0167357 A1 | 7/2011 | Benjamin |
| 2011/0238755 A1 | 9/2011 | Khan |
| 2012/0047457 A1 | 2/2012 | Park |
| 2012/0088524 A1 | 4/2012 | Moldavsky |
| 2012/0149309 A1 | 6/2012 | Hubner |
| 2013/0006749 A1 | 1/2013 | Fink |
| 2013/0061296 A1 | 3/2013 | Reddy |
| 2013/0176142 A1 | 7/2013 | Drysdale |
| 2013/0185368 A1 | 7/2013 | Nordstrom |
| 2013/0247165 A1 | 9/2013 | Pal |
| 2014/0162601 A1 | 6/2014 | Kim |
| 2014/0192737 A1 | 7/2014 | Belghoul |
| 2014/0258323 A1 | 9/2014 | Mauro |
| 2014/0344252 A1 | 11/2014 | Kapoor |
| 2014/0378123 A1 | 12/2014 | Stojanovski |
| 2015/0081640 A1 | 3/2015 | Long et al. |
| 2015/0147972 A1 | 5/2015 | Motto |
| 2015/0199442 A1 | 7/2015 | Hahn |
| 2015/0208226 A1 | 7/2015 | Kuusilinna |
| 2015/0222639 A1 | 8/2015 | Dulkin |
| 2015/0263833 A1 | 9/2015 | Li |
| 2016/0034619 A1 | 2/2016 | Peyerl et al. |
| 2016/0063558 A1 | 3/2016 | Kim |
| 2017/0054738 A1 | 2/2017 | Avidan et al. |
| 2017/0099579 A1* | 4/2017 | Ryan ................... H04M 3/5116 |
| 2017/0134901 A1 | 5/2017 | Uyanik |
| 2017/0161288 A1 | 6/2017 | Feldman et al. |
| 2018/0108023 A1* | 4/2018 | Stewart ................ G06Q 30/016 |
| 2018/0160278 A1 | 6/2018 | Patel et al. |
| 2019/0113345 A1* | 4/2019 | Stewart ............... G06F 3/04812 |
| 2019/0114293 A1 | 4/2019 | Li et al. |

OTHER PUBLICATIONS

Balakrishnan, Dineshbalu, and Amiya Nayak. "An efficient approach for mobile asset tracking using contexts." IEEE Transactions on Parallel and Distributed Systems 23, No. 2 (2011): 211-218. (Year: 2011).*
U.S. Office Action issued in U.S. Appl. No. 14/793,488, dated Aug. 9, 2017, 21 pages.
U.S. Office Action issued in U.S. Appl. No. 14/793,488, dated May 16, 2018, 22 pages.
U.S. Office Action issued in U.S. Appl. No. 15/006,300, dated Jan. 11, 2018, 12 pages.
U.S. Office Action issued in U.S. Appl. No. 15/006,300, dated Jul. 25, 2018, 21 pages.
U.S. Office Action issued in U.S. Appl. No. 14/793,488, dated Nov. 14, 2018, 24 pages.

* cited by examiner

AUTOMATICALLY DEFINING GROUPS IN DOCUMENTS

CROSS-REFERENCE TO RELATED APPLICATION

This application claims the benefit of U.S. Application No. 62/665,766, filed May 2, 2018, the contents of which are incorporated by reference.

TECHNICAL FIELD

This disclosure relates to data processing and data distribution.

BACKGROUND

A database is a collection of information that may include data, raw numbers, and text, and other similar data. Users may interact with and retrieve data from a database by querying the database. Users may share documents that include or illustrate data stored in the database.

SUMMARY

Techniques are described that allow users to create and share documents that present details and perform analytics on objects that are located in a particular geographic region. A creating user may create a document and specify that the document display particular visualizations related to analytics performed on a group of objects, such as people, cars, devices, or any other type of asset. The creating user may not specify the particular objects. Instead, the creating user shares the document with a consuming user. The consuming user may select a geographic region for the objects. The document may identify the objects that are currently located within the geographic region and update the visualizations using the attributes of the objects currently located within the geographic region. The document may update in real time as objects move in and out of the geographic region or as attributes of the objects change. By updating the document in real time, the system may preserve network resources by not transmitting a document that includes data identifying each object in the geographic region. Instead, the system transmits, to the consuming user, a leaner document that only includes data that identifies a geographic region that the consuming user can populate with objects as requested.

The consuming user may save the group of objects that are located in the geographic region and share the group of objects with other users. The other users may access the group of objects and perform analytics on the group of objects. To share the group of objects, the system may store data identifying each object and grant access to the data identifying each object. The system may save computing resources because each user can perform analytics on the group of objects without the user having to access the system to reapply the geographic filter.

An innovative aspect of the subject matter described in this specification may be implemented in a method that includes the actions of accessing, by one or more computers, document data for a document having content that is adjustable based on geographic locations of objects; determining, by the one or more computers, multiple object types specified by the document data, the multiple object types indicating types of objects that are discoverable using the document; obtaining, by the one or more computers, object location data indicating locations associated with objects; identifying, by the one or more computers and based on the object location data, objects having the determined object types that are associated with locations in a particular geographical area; obtaining, by the one or more computers, attributes of the identified objects from one or more databases; and generating, by the one or more computers, a view of the document based on the document data, the identified objects, and the obtained attributes.

These and other implementations can each optionally include one or more of the following features. The action of generating a view of the document includes providing, for display, a map that indicates locations of the identified objects and object types of the identified objects. The action of determining multiple object types specified by the document data, the multiple object types indicating types of objects that are discoverable using the document includes determining the multiple object types as a subset of available object types, wherein object types of the available object types other than the multiple object types are not discoverable using the document. The action of obtaining object location data indicating locations associated with objects includes obtaining, from each object, GPS data that indicates a location associated with an object; or obtaining, from each object, data communicated over short range radio indicating a location associated with an object.

The types of objects that are discoverable using the document include a person with a mobile device; a building; or a shipping container with a location beacon. The actions further include obtaining, by the one or more computers, updated object location data indicating updated locations associated with the objects; and updating, by the one or more computers, the view of the document based on the updated object location data. The actions further include providing, for output, a control that, upon selection, captures a current view of the document including the identified objects and the obtained attributes; receiving a selection of the control; and in response to receiving a selection of the control, storing data that identifies the identified objects. The actions further include, in response to receiving a selection of the control, storing additional data that identifies the obtained attributed.

The actions further include, in response to receiving a selection of the control, storing additional data that is required to recreate the current view of the document. The actions further include, based on the identified objects and the obtained attributes, generating a filter that is configured to filter additional documents. The actions further include aggregating the obtained attributes for identified objects of a same type. The actions further include updating the view of the document by including additional visualizations of the identified objects and the obtained attributes. The actions further include providing, for output, a control that, upon selection, captures and shares a current view of the document with a user. The action of identifying objects having the determined object types that are associated with locations in a particular geographical area includes identifying people who are located in the particular geographical area. The actions further include providing, for output, a control that, upon selection, initiates communication with the identified people.

The actions further include, based on the determining multiple object types specified by the document data, determining, for each type of object, a set of attribute fields. The action of determining, for each type of object, the set of attribute fields includes transmitting a request for the set of attribute fields for each type of object; and, in response to the request for the set of attribute fields for each type of object, receiving data identifying the set of attribute fields for each type of object. The action of determining, for each type of object, the set of attribute fields includes analyzing the identified objects. The actions further include storing, by the one or more computers, data identifying the identified objects; receiving, by the one or more computers, a request to provide, to a user, the data identifying the identified objects; and, in response to the request to provide, to the user, the data identifying the identified objects, providing, by the one or more computers, the data identifying the identified objects.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A user may be able to view in real-time the locations of objects in an area specified by the user. The user may view analytics performed on real-time attributes of those objects.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1B and 1C illustrate example dashboards.

DETAILED DESCRIPTION

Figure 1A:
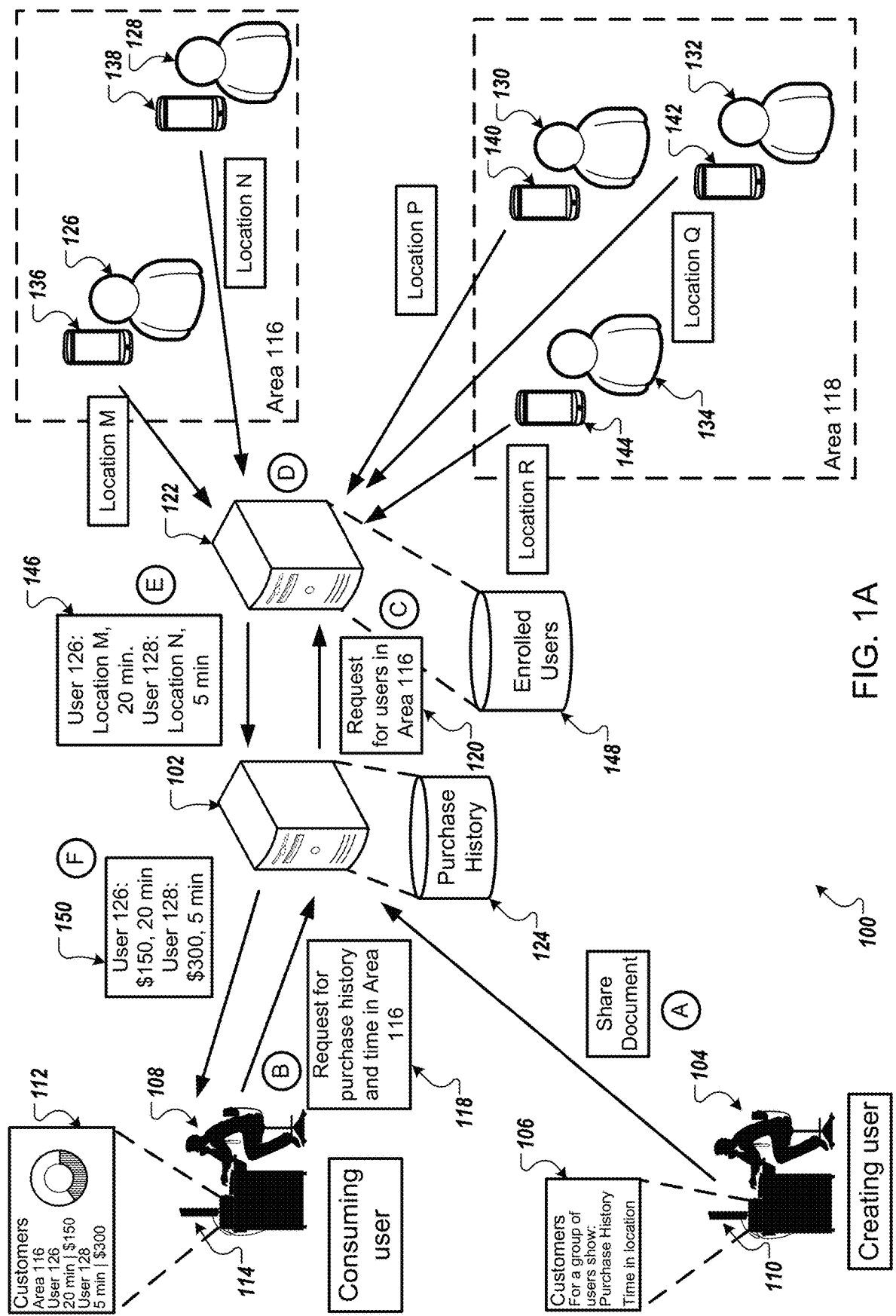
FIG. 1A is a diagram of an example system for creating and identifying groups in a document.

FIG. 1A is a diagram of an example system 100 for creating and identifying groups in a document 106. Briefly, and as described in more detail below, the system 100 includes a server 102 that allows a creating user 104 to share a document 106 with a consuming user 108. The creating user 104 can create the document to show visualizations of data related to various objects and can allow the consuming user 108 to define the set of objects for the visualization. The set of objects may be those that are located within a geographic region specified by the consuming user 108. While the example shown in FIG. 1A illustrates the creating user 104 and the consuming user 108 interacting with a document, which will be discussed in detail in relation to FIG. 3A, the system 100 may be used to create and identify groups in any type of document. For example, the document may be a spreadsheet, presentation, word processing document, image, or any other type of document that is capable of displaying graphical data.

As shown in the example of FIG. 1A, the creating user 104 may create a document 106 using the client device 110 during stage A. The creating user 104 may define the document to include various content and visualizations for data stored on the server 102 and other servers. The creating user 104 may add a visualization for objects located in or otherwise associated with different geographic locations. In the example shown in FIG. 1A, the creating user 104 may include, in the document 106, a visualization for the purchase history of people and the time that the people were in a geographic location. The creating user 104 may design the visualization such that the consuming user 108 may define the geographic region where the people are located. Depending on the people who are presently located in the geographic region specified by the consuming user 108, the visualization may show different information. The creating user 104 may include visualizations of other types of objects in addition to people in the document. The creating user 104 may include visualizations for shipping containers, buildings, cars, or any other similar type of object.

The creating user 104 shares the document 106 with the consuming user 108. The server 102 stores the document 106. The consuming user 108 receives a notification that the creating user 104 shared the document 106. The consuming user 108 may open the document 106 on the client device 114. Document 112 may represent the view of document 106 when viewed by a consuming user such as after the consuming user 108 has selecting a geographic region for the objects identified in the document 106.

In stage B, the consuming user 108 selects a geographic region for the objects specified by the document 112. The consuming user 108 draw the geographic region on a map, describe the geographic region by areas such as countries, stages, cities, etc., or may select from a predefined geographic region that the creating user 104 may have included in the document 106. In the example in FIG. 1A, the consuming user 108 may request to view a visualization for the people who are located in area 116. The client device 114 may transmit a request 118 for data related to the people who are located in area 116.

The server 102 receives the request 118. The server 102 may not have access to the current location any people who are in area 116. For that information, the server 102 may transmit, to server 122, a request 120 for the people who are located in area 116. In some implementations, the request 120 may include a definition of the boundaries of area 116. The request 120 may also include a request for any information related to the people that the server 102 may not have access to. For example, the server 102 may have purchase history information 124 that is tied to different users. The server 102 may access the purchase history information 124 and may not have access to an amount of time that each user in area 116 has been located in area 116.

In stage D, the server 122 receives the request 120 and collects location information for people who are located in area 116. Area 116 includes user 126 and user 128. Other users may be located in other areas. For example, area 118 may include user 130, user 132, and user 134. Each user may have a mobile device that communicates with server 122. In some implementations, the server 122 may periodically request location information from each of the mobile devices. For example, every five minutes, the server 122 may request GPS data from mobile devices 136, 138, 140, 142, and 144. In some implementations, each area may include a computing device that is configured to communicate with nearby mobile devices over shortwave radio signals. For example, area 116 and area 118 may each include a shortwave radio device that periodically detects nearby mobile devices. In some implementations, the server 122 may request location data from each mobile device in response to the request 120. In this instance, the server 122 may not have past data related to the location of each mobile device. The server 122 may have to request location data that covers a previous time period such as the past three hours.

In some implementations, the server 122 may access enrolled user information 148. The enrolled user information may include data that correlates each user with a mobile device. For example, enrolled user information 148 may include that mobile device 144 belongs to user 134, and mobile device 138 belongs to user 128. The enrolled user information 148 may include details for communicating with each of the mobile devices.

The server 122 collects the location data for the users and identifies the users in area 116. In stage E, the server 122 provides the location data 146 to the server 102. For example, the server 122 may provide data indicating that within area 116, user 126 is at location M and user 128 is a location N. The location data 146 may indicate that user 126 has been within area 116 for twenty minutes and user 128 has been within area 116 for five minutes.

The server 102 receives the location data 146 and accesses the purchase history 124 of the users located in area 116. For example, area 116 may be a particular location of a store chain and area 118 may be another location of the same store chain. The purchase history 124 may indicate that user 126 spent one hundred fifty dollars at the store chain and that user 128 spent three hundred dollars at the store chain.

The server 102 may process the location data 146 and purchase history 124 and generate the updated document 112. The document 112 may include visualizations of the location and purchase data 150 that the server 102 collected and aggregated. The type of visualizations may be specified by the creating user 104 in document 106.

In some implementations, the server 102 may update the document 112 while the consuming user 108 is viewing the document 112. For example, the server 102 may receive or request updated location information for the users in area 116. Mobile device 140, and therefore, user 130 may be located in area 116. The server 122 may provide updated location data 146 that includes user 130 in area 116. The server 102 may access the purchase history 124 of user 130 and update the document 112.

In some implementations, the consuming user 108 may select a different area to visualize in the document 108. For example, the consuming user 108 may request to view the visualization for area 118. In this instance, the system 100 may execute the stages B, C, D, E, and F to identify the users located in area 118. The system 122 provides data identifying the users 130, 132, and 134 to the server 102. The server 102 accesses the purchase history 124 for the users 130, 132, and 134, and updates the document 112.

In some implementations, the document 112 may be sharable with other users. For example, the consuming user 108 may select a user to share the document 112. The shared version of the document 112 may include the filters and annotations applied by the consuming user 108. In some implementations, the filters of the document 112 may identify a new group of objects as the objects may have relocated during the time between the consuming user 108 annotated the document 112 and other user viewed the shared document.

In some implementations, the creating user 108 may restrict the objects that are accessible by the document 112. For example, there may be various types of objects located in area 116. There may be users, such as users 126 and 128, in addition to inventory and equipment that are locatable using NFC tags. The creating user 108 may limit the document 112 to display analytics related to the users who are located in area 116. Because the user limited the types of objects discoverable by the document 112, the server 102 and server 122 may decrease the amount of computing power needed when another user views the document 112. In instances where the consuming user 108 includes the filter in document 112 to display the objects in area 116 and another user views the document, the server 102 and server 122 use computing and network resources to identify the object of different types that are located in area 116 that may include users, inventory, equipment, etc. In instances where the consuming user 108 includes the filter in document 112 to display the objects who are users in area 116 and another user views the document, the server 102 and server 122 use less computing and network resources to identify the users in area 116 because the server 102 and server 122 do not identify any inventory or equipment that may also be in area 116.

Figure 1B:
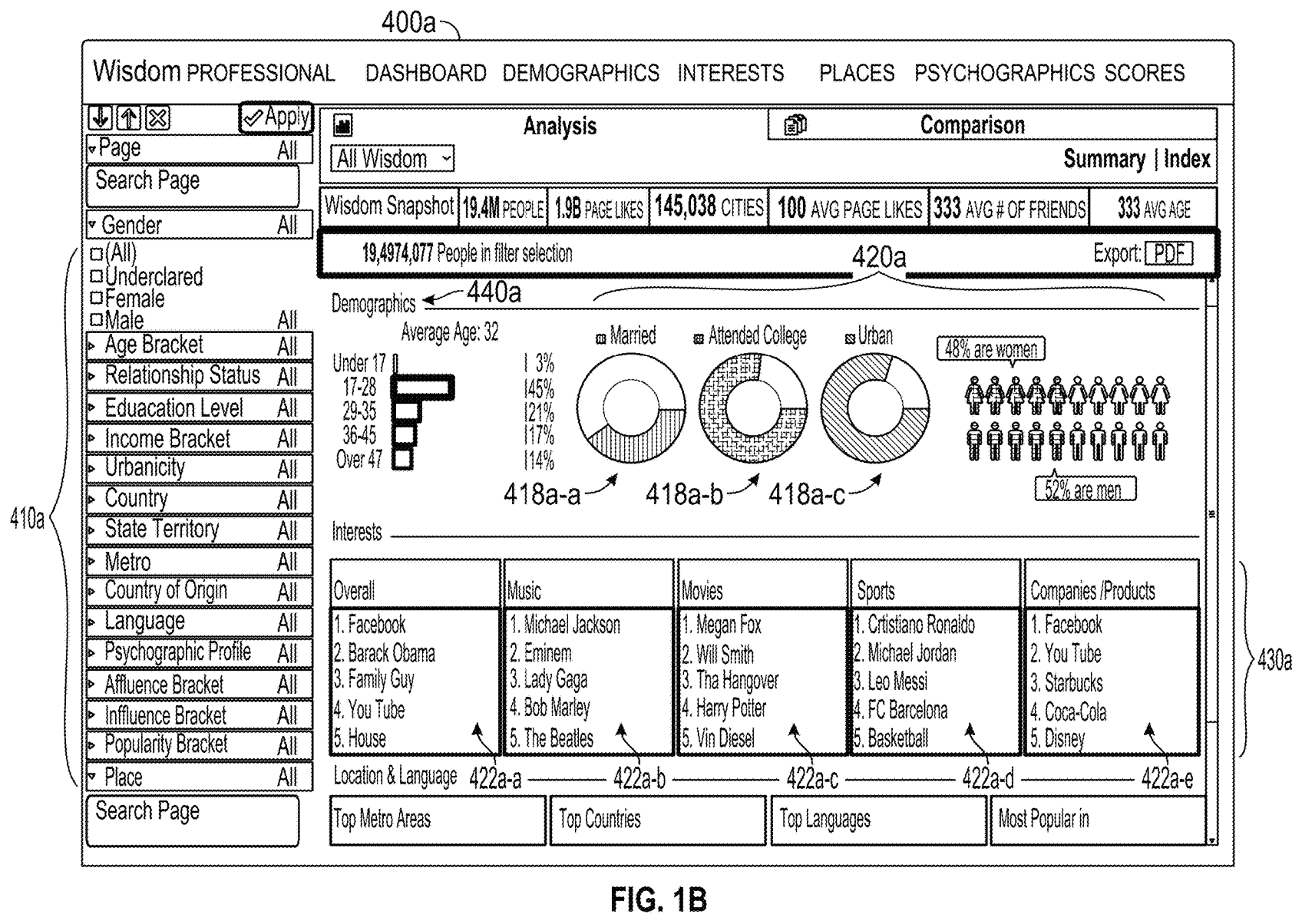

FIG. 1B illustrates an example user interface 400a of a dashboard interface. Dashboard interfaces may be included in a dashboard, dossier, web page, or any other document that may display graphical data. The visualizations of the document 106 and document 112 may include a dashboard interface or characteristics of a dashboard interface. The user 104 and user 108 may interact with the graphical data of document 106 and document 112 in a similar fashion to the interactions described in relation to the interface 400a and interface 500b.

As shown, interface 400a comprises a plurality of control objects 410a-440a. For example, control objects include grids (e.g., data displayed in table format), graphs, text fields, shapes, etc. that users can use to navigate through the data presented through interface 400a. Interface 400a can be powered by the in-memory analytic data store described throughout this disclosure. In this regard, in some implementations, the analytic data store powers an extensive market intelligence network that provides the data shown in user interface 400a. For example, computer systems implementing the techniques described herein uses information about an application and/or design aspects of dashboard 400a to generate queries to the in-memory data store.

For example, all of the market intelligence data used by and displayed through the intelligence dashboard interface 400a can be loaded into the in-memory analytic data store. In this example, user interface 400a receives user input defining filter criteria 410a related to the market intelligence information a user seeks. Filter criteria 410a can include demographics data or any other type of data as shown in interface 400a or otherwise available to filter the market intelligence data stored in the in-memory analytic data store. For example, the user may be able to filter the data by gender, age, relationship status, education level, income bracket, urbanicity, etc. A query execution engine can receive the user input defining filter criteria 410a, and execute queries to access the market intelligence data stored in an in-memory analytic data store. In some examples, the query execution engine can receive the accessed data, perform analytics on the accessed data, and output the results of the analytics to user interface 400a.

As shown in FIG. 1B, the user interface 400a specifies the demographic data used to generate the dashboard output broken down into various categories 420a (e.g., as shown in charts 418a-a, 418a-b, and 418a-c) and outputs ranked lists of interests 422a-a to 422a-e for people that fall within the demographic profile 440a defined by the filter criteria 410a. For example, the categories 420a can include what percentage of the relevant population is married, has attended college, or lives in an urban area. Other types of output and data visualization can be used. In addition, the user interface 400*a* can receive additional user input to refine or change the filter criteria 410*a* or the results sought and the user interface 400*a* can dynamically update in short order given the in-memory data retrieval and processing that occurs responsive to the additional user input.

Figure 1C:
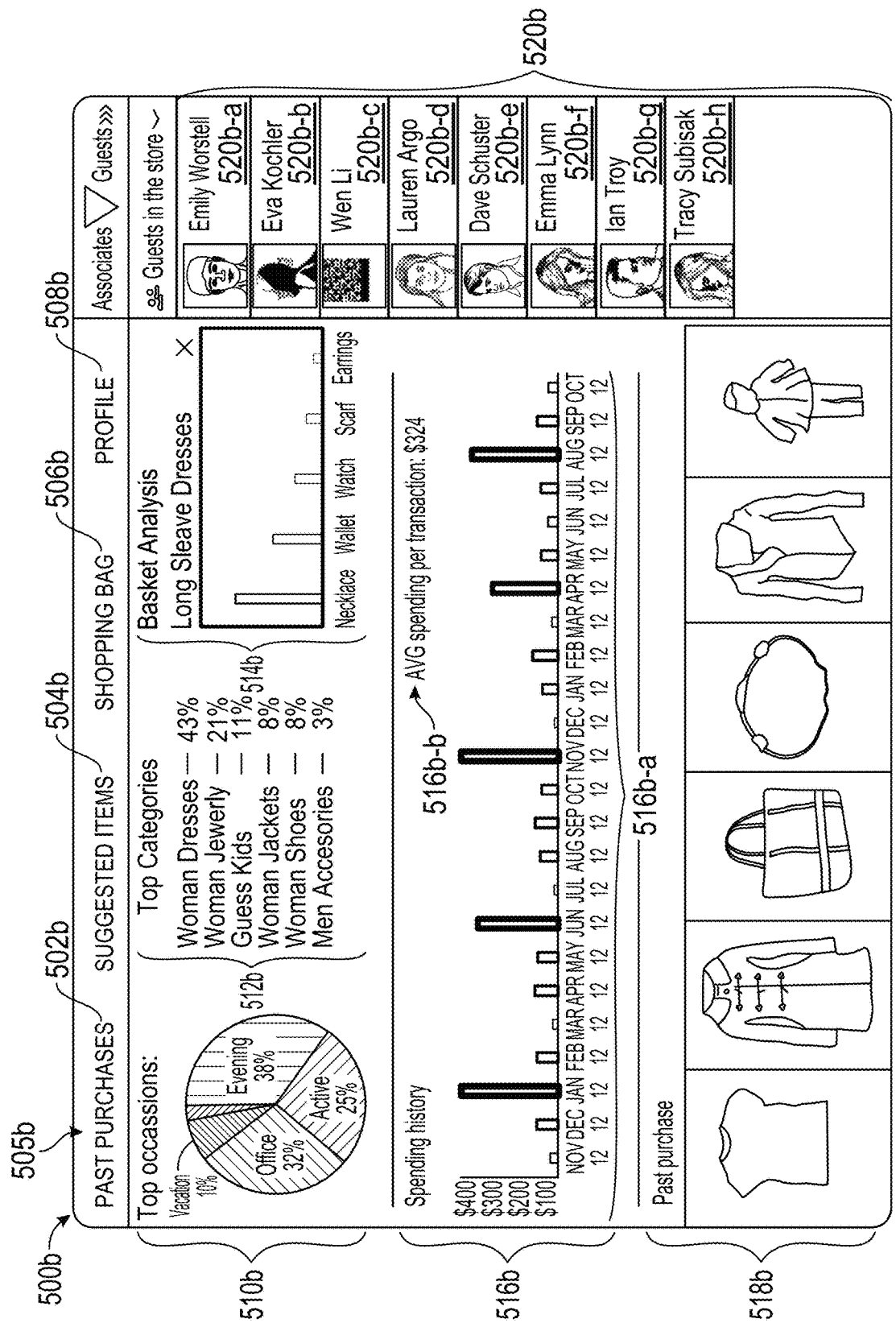

By way of example, FIG. 1C shows a user interface 500*b* of an intelligence dashboard also powered by an analytical in-memory data store. Interface 500*b* displays a customer report 505*b* to, e.g., a sales associate in a retail store. In an example, the sales associate can view the customer report 505*b* on a store computer.

In some examples, graphical user interface 500*b* includes customer portion 520*b* that displays information indicative of customers who are, e.g., in a particular geographic location (say, the retail store). Customer portion 520*b* displays customer information 520*b-a* to 520*b-h*, with each item of customer information 520*b-a* to 520*b-h* representing a customer. A user can select customer information 520*b-a* to 520*b-h* by, for example, using a mouse to click on, or using a touch screen display to touch, a desired item of customer information 520*b-a* to 520*b-h*. When an item of customer information 520*b-a* to 520*b-h* is selected, interface 500 displays information pertaining to the selected customer. In the interface 500, a viewer of graphical user interface 500, e.g., the sales associate, has opted to view information associated with the customer represented by customer information 520*a*.

A query execution engine can receive the user input, e.g., selection of customer information 520*b-a* to 520*b-h*, and execute queries to access the market intelligence data stored in an in-memory analytic data store. In some examples, the query execution engine can receive the accessed data (e.g., data from the in-memory analytic data that complies with the filter criteria 410*a*), perform analytics on the accessed data, and output the results of the analytics to user interface 500*b*.

As shown, interface 500*b* includes past purchases link 502*b*, selection of which causes interface 500*b* to display information indicative of past purchases of the customer that is selected via customer portion 520*b*. Interface 500*b* also includes suggested items link, selection of which causes interface 500*b* to display suggestions information 504*b* indicative of suggested items that a particular customer (e.g., the customer selected from customer portion 520*b*) may be interested in and want to purchase. Suggestions information 504*b* can based on analyzing data that is retrieved from an in-memory analytic data store. For example, suggestions information 504*b* can be based on customers' past purchases. Interface 500*b* includes shopping bag link 506*b*, selection of which causes graphical user interface 500*b* to display items that a particular customer wishes to purchase. Interface 500*b* includes profile link 508*b*, selection of which causes interface 500*b* to be updated to display a customer profile of a particular customer (e.g., the customer selected via currently present customer portion 520*b*).

Interface 500*b* includes top occasions portion 510*b* that displays information (e.g., a graph) indicative of the top occasions for which a particular customer (e.g., customer 520*b-a*) has purchased merchandise. Information for top occasions portion 510*b* can be generated based on analytics performed on market intelligence data contained in an in-memory data store. In this example, top occasions portion 510*b* is generated by tracking past purchases of the customer and then categorizing the types of purchase (e.g., based on various occasions). In another example, top occasions portion 510*b* displays information indicative of the top occasions for a group of customers, e.g., rather than displaying the top occasions for a particular customer.

Interface 500*b* also displays top categories information 512*b*, e.g., information specifying top categories of goods that have been purchased by a particular customer and/or by a group of customers at a retail store. Information for top categories portion 510*b* can be generated based on analytics performed on market intelligence data pertaining to the particular customer and/or the group of customers contained in an in-memory data store. In some implementations, interface 500*b* can include basket analysis portion 514*b*—for display of information indicative of types of goods that are currently in an electronic shopping cart of a customer.

Graphical user interface 500*b* also includes spending history portion 516*b* to display information indicative of how much money a particular customer (e.g., the customer selected in portion 520*b*) has spent with the retailer over a period of time. Information for spending history portion 516*b* can be generated based on analytics performed on market intelligence data pertaining to the particular customer contained in an in-memory data store. Spending history portion 516*b* can include a timeline 516*b-a*, e.g., a representation of the period of time over which spending is tracked. Spending history portion 516*b* also includes information 516*b-b* that specifies an average amount of money a particular customer has spent with the retailer over a period of time. Interface 500*b* also includes portion 518*b* for display of information indicative of past purchases and/or transactions of a particular customer.

Figure 2:
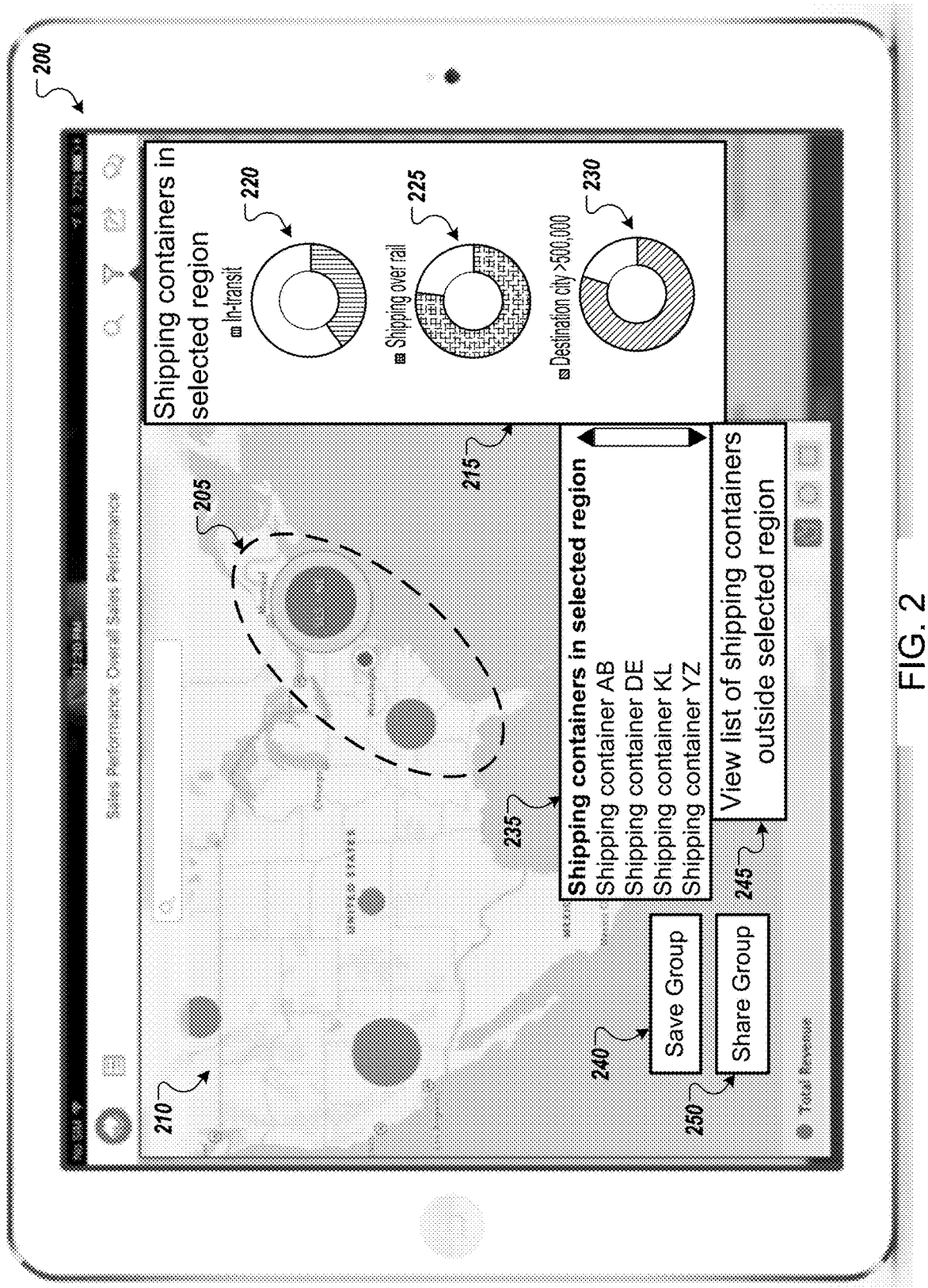
FIG. 2 illustrates an example interface for creating and identifying groups.

FIG. 2 illustrates an example document interface 200 with a selection of a geographical region 205. Briefly, and as described in more detail below, the document interface 200 allows a user to select the geographical region 205 of the map 210. The document identifies the objects that are located within the geographical region 205 and presents a visualization 215 of the attributes of the objects. While FIG. 2 illustrates an example document interface 200, the characteristics of the document interface 200 may be included in any portion of a document that is configured to display graphical data.

In more detail, a creating user may design the document interface 200 to include particular visualizations. The visualizations may populate with data that is related to objects selected by the consuming user. In document interface 200, the creating user designates the visualizations 215 that includes graphs related to the attributes of the shipping containers located in the geographic region 205. The visualizations 215 include a graph 220 that displays the portion of the shipping containers located in the geographic region 205 that are in transit. The visualizations 215 also include the graph 225 and the graph 230. The graph 225 displays the portion of the shipping containers located in the geographic region 205 that are have been or are being shipped over rail. The graph 230 displays the portion of the shipping containers located in the geographic region 205 that have a destination of a population center with greater than 500,000 people.

The consuming user may adjust the geographic region 205. In response to the consuming user adjusting the geographic region 205, the document interface 200 may update the visualizations 215. In this instance, the geographic region 205 may encircle different shipping containers, thus causing the visualizations 215 to change. For example, the consuming user may select a geographic region to the west of geographic region 205. The server may identify the shipping containers that are located in the selected region and update the visualizations 205.

In some implementations, the consuming user may select a geographic region that includes the nearby areas. For example, the consuming user may select a geographic region that includes a radius of one hundred miles around the consuming user. In this instance, the server may identify the shipping containers that are located within one hundred miles of the consuming user. The server may update the visualizations 205 based on the attributes of the shipping containers that are located within one hundred miles of the consuming user. The consuming may relocate to a different location. In this instance, the server may identify the shipping containers that are located within one hundred miles of the consuming user's new location.

In some implementations, the consuming user may select a geographic region in a way other than selecting a region on a map or specifying a radius around the consuming user's location. The consuming user may select a geographic region that is the building where the consuming user is located. The geographic region may be a particular a building where the consuming is not located. The consuming user may select a particular room or space within a building. For example, instead of shipping containers, the creating user may have specified a different object, such as people. The consuming user may select a room and the server may identify the people who are located in the room. The server may identify attributes of the people located in the room and update the visualizations specified by the creating user.

In some implementations, the consuming user may save the current view of the document interface 200. For example, the consuming user may save the view of the document interface 200 with geographic region 205 selected. The consuming user may save the view of the visualizations 215 when the geographic region 205 is selected. The consuming user may also save the geographic region 205 independent of the visualizations 215. By saving the geographic region 205, the consuming user may later load the geographic region 205 which may cause the document interface 200 to show different visualizations 215 depending on different shipping containers being located within the geographic region 205.

The consuming user may create a filter in the document interface 200. For example, the consuming user may segment the geographic region 205 and display visualizations 215 for each of the segments of the geographic region 205. The consuming user may save the filter applied to the geographic region 205. The consuming user may apply the filter to another geographic region or share the filter with another consuming user.

The consuming user may also save the view of the document interface 200. By saving the view of the document interface 200, the geographic region 205 and visualizations 215 may not change the next time the consuming user loads the save view of the document interface 200. The consuming user may share the saved view of the document interface 200 with another consuming user.

In some implementations, the document interface 200 includes a list 235 of objects located in the geographic region 205. In the example shown in FIG. 2, the list 235 includes the shipping containers located in the geographic region 205. The list 235 may be dynamic in that the list 235 includes the objects located in the geographic region 205 in real-time or near real-time. The list 235 may be static in that the list 235 includes the objects located in the geographic region 205 at the time that the user selected the geographic region 205. The list 235 may update as the user adjusts the boundary of the geographic region 205.

In some implementations, the document interface 200 includes a button 245 that, upon selection, shows the list of objects that are not selected by the geographic region 205. For example, if the user selected button 245, then the list 235 may change to include the shipping containers that are located outside of the geographic region 205. In some implementations an additional list may appear on the document interface 200 that includes the shipping containers that are located outside of the geographic region 205 while the list 235 remains. Similar to list 235, the list of objects that are not selected by the geographic region 235 may be dynamic or static.

In some implementations, the document interface 200 includes a button 240 that, upon selection, saves the group of objects selected by the geographic region 205. In the example shown in FIG. 2, the user may select the button 240 and the server may store data that identifies the group of shipping containers included in the geographic region 205. In some implementations, the button 240 may save the group of objects that are not included in the geographic region 205 in the case where the user selects button 245 and the document interface 200 includes the objects outside of the geographic region 205 in list 235.

In some implementations, the document interface 200 includes a button 250 that, upon selection, shares the group of objects selected by the geographic region 205 with other users who are selected by the user. For example, the user may select button 250 and identify two users. The server may store the group of objects selected by the geographic region 205 and transmit that group to the identified users.

Figure 3:
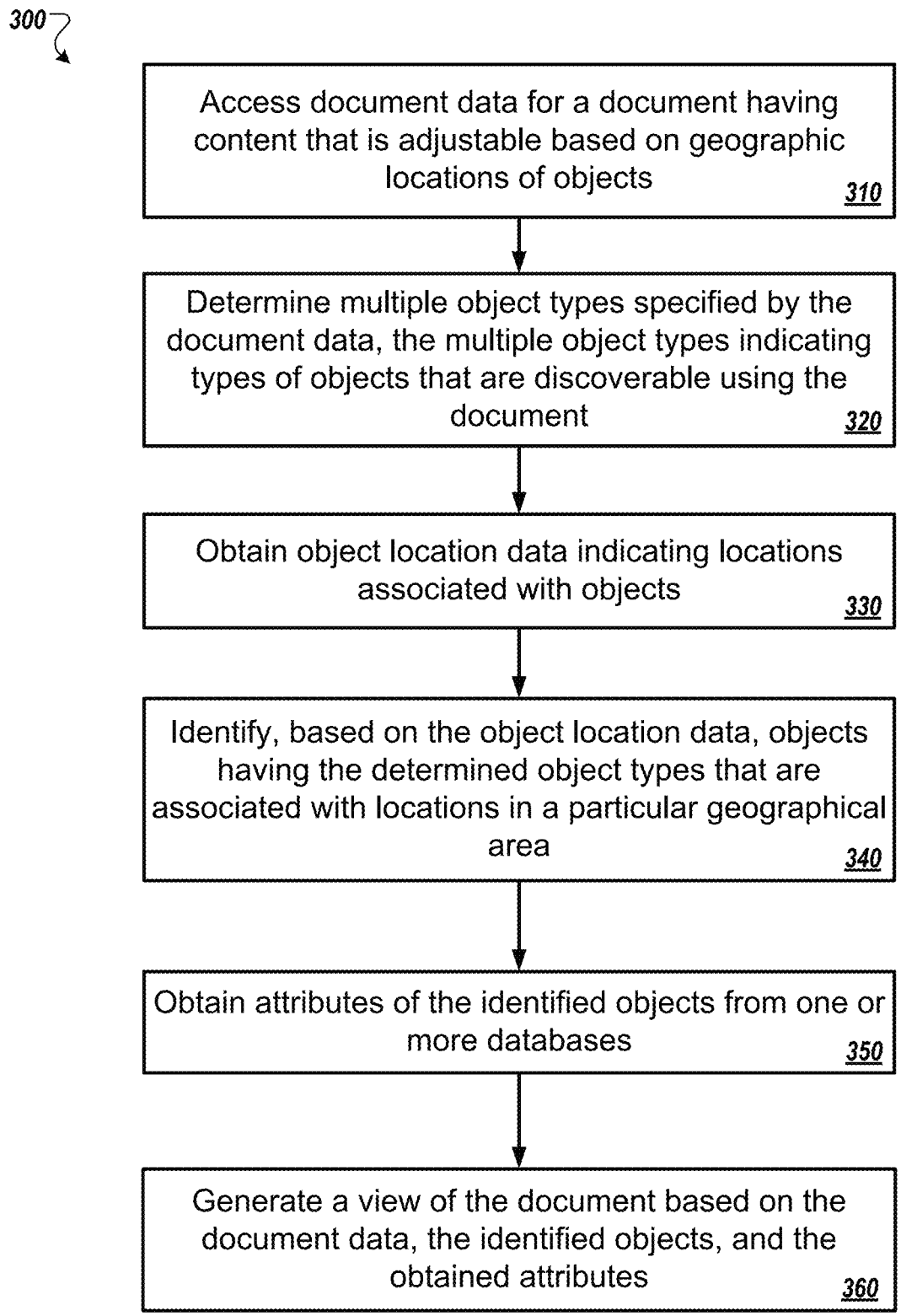
FIG. 3 illustrates an example process for creating and identifying groups.

FIG. 3 illustrates an example process 300 for automatically defining groups in a document. The operations of the process 300 are described generally as being performed by the system 100 of FIG. 1A. In some implementations, operations of the process 300 may be performed by one or more processors included in one or more electronic devices.

The system accesses document data for a document having content that is adjustable based on geographic locations of objects (310). In some implementations, the document is a document. In some implementations, the document is any type of document that is configured to adjust the display of the document based on a user interacting and selecting a geographic region. In some implementations, a creating user creates the document and shares the document with a consuming user. The creating user specifies the objects that will be viewable in the document. The consuming user may view different data presented by the document depending on the geographic locations of the objects.

The system determines multiple object types specified by the document data, the multiple object types indicating types of objects that are discoverable using the document (320). In some implementations, the object type may be a person who may have a mobile device or other device to detect the person's location, a building that may include a device to transmit the location of the building, a shipping container that may include a device to transmit the location of the shipping container, or any other type of object that may have a location and that can transmit its location, possibly with the assistance of another device. In some implementations, there may be multiple type of objects that may be discoverable by the document. For example, the document may be able to discover people, buildings, shipping containers. The creating user may specify that the document discovers people. The creating user may specify, perhaps expressly, that the document is not configured to discover building, shipping container, or other types of objects. The creating user may specify that the document discovers other objects in addition to people.

The system obtains object location data indicating locations associated with objects (330). In some implementations, the system may access a server or other computing system that stores or maintains the locations of each object. In this instance, the server or other computing system may interact with the devices of the objects to obtain location data. For example, the server may receive GPS data from each of the devices. The server may correlate the GPS data from each device with the objects so that the location of each device is defined by GPS data. As another example, the server may receive beacon data from transmitted from each of the devices. The beacon data may be a short range radio transmission. The server may obtain the location of each beacon based on a signal strength and directionality of each beacon signal. In some implementations, the system may be integrated with the server or other computing system.

The system identifies, based on the object location data, objects having the determined object types that are associated with locations in a particular geographical area (340). In some implementations, the particular geographical area is defined by a consuming user. For example, the consuming user selects a region on a map. In other examples, the consuming user select a radius around the consuming user or selects from geographic areas specified by the system. The system compares the particular geographical area with the locations of the objects. The system identifies the objects that are located within the particular geographical area.

The system obtains attributes of the identified objects from one or more databases (350). In some implementations, system obtains a set of attribute fields. The attribute fields may be specified by the creating user. For example, the people may have attribute fields such as age and gender. In the context of people in a store, the attribute fields may also include money spent in the store, time spent in each location of the store, items purchased in the store, current time spent in the current location of the person, and other similar attribute fields. The creating user may specify that the document display visualizations are related to, for each person, age, time spent in each location of the store, items purchased in the store, and current time spent in the current location. In some implementations, the system may request, from a server or computing device, the attribute fields for each of identified types of objects that are identified by the document.

The system accesses attribute data for each of the objects located within the geographic region. In some implementations, the system may access the attribute data through a different server or computing device. For example, the system may query a database for data related to each person's time spent in each location of the store, items purchased in the store, and current time spent in the current location. The system may query the same or a different database for data related to each person's age. The system may receive a response to the query that includes the requested data. In some implementations, the system analyzes the objects to determine the attribute fields. For example, the system may analyze objects that are people and determine that some attribute fields may be gender and age. As another example, the system may analyze objects that are buildings and determine that some attribute fields may include location and square footage.

The system generates a view of the document based on the document data, the identified objects, and the obtained attributes (360). For example, the system generates a view of the document based on the document design specified by the creating user, the identified people, and, for each person, the age, time spent in each location of the store, items purchased in the store, and current time spent in the current location. In some implementations, the system aggregates the attributes of the identified objects of the same type. For example, the system may aggregate the ages of the identified people and create a visualization related to the age of the people in the particular geographic location.

In some implementations, the system receives updated location data for the types of objects specified by the document. The system may compare the updated location data for the objects to identify the objects that are within the particular geographic location. The system may receive updated attribute data for the objects. The system may receive updated attribute data periodically, such as every five minutes or in response to a refresh command from the user. The system may update the view of the document based on the updated objects and attribute data.

In some implementations, the view of the document may include a map that indicates the locations of the identified objects. The user may update the geographic region to include specific objects. The system may update the view of the document as the geographic region encircles different objects.

In some implementations, the document may include a control that, upon selection, instructs the system to capture the current view of the document. The current view of the document may be the objects located in the particular geographic region and the obtained attributes. The consuming user may select the control and store data identifying the objects located in the particular geographic region and the current attributes. The consuming user may later view the captured objects and the captured attributes. The consuming user may view the current location of the captured objects and the updated attributes. The document may highlight any changes in the locations of the objects and any attributes that changed.

In some implementations where the objects are people, the document may provide a control to communicate with the people. In some implementations, the control may be for communication with people inside the geographic region. For example, the consuming user may communicate a coupon to people who are located inside a store.

In some implementations, the consuming user may manipulate and filter the view of the document. For example, the consuming user may filter the people to show visualizations for one gender. The consuming user may save this filtered view and share the view with other users. Other users and the consuming user may apply the filter to the document or to other documents. In some implementations, the consuming user may capture a current view of the document and share that current view with other users or save the current view for later viewing.

In some implementations, the system updates the view of the document. The system may update the view in response to a request from the user. For example, the user requests that system show data for objects in a different geographic area. The system may update the view in response to objects moving in and out of the geographic area. The system may update the view at periodic intervals such as every two minutes.

Figure 3A:
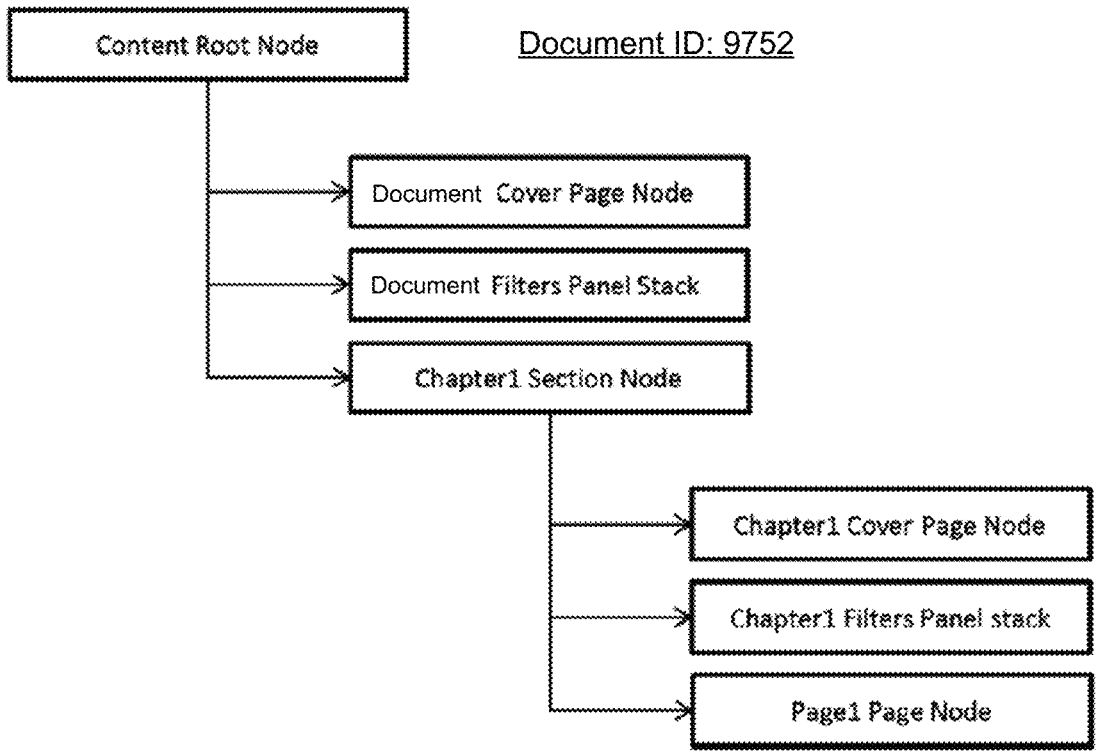
FIG. 3A illustrates an example document structure.
Figure 3A:
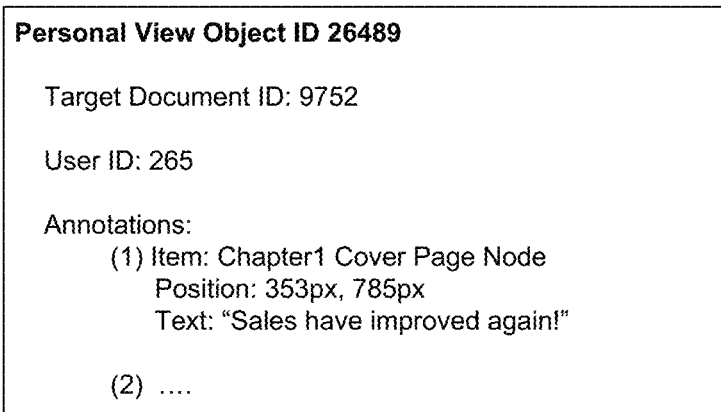

FIG. 3A illustrates an example structure of a document. The document is a defined collection of documents or interfaces that can be distributed or shared with other users. The document generally includes a user-selected grouping of interfaces, such as documents, dashboards, reports, or other objects. These object can be presented with a specified layout, formatting, or sequence defined by the creating user. These interfaces can include interactive elements, such as filters and other controls, that have behavior specified by the user that creates the document. In this manner, the document can be viewed and interacted with similar to an application. The document can include data connecting the elements to live data sources. For example, a document may include data connecting a chart, table, or map shown in a dashboard of the document to a data set provided by a database server. The chart, table, or map can be updated so that users can be shown the current information from the database each time they view the document. Of course, a document may include or reference a static data set, and filters or other controls may operate on the static data set. Similarly, pre-generated content elements that do not change can also be presented.

Documents can have a variety of characteristics. In some implementations, a document defines a closed set of elements or data sources. For example, a recipient of a document may be able to filter or manipulate data from data set that the creating user specified, but the recipient may be restricted from adding new data sources to the document. Sharing a document may grant the recipient access to a data source for viewing and use within the document.

A document may permit a user to make a variety of changes, and may also restrict some changes to the document. Once a document is shared, different versions of the document may be created, each linking back to the original, master version. In some implementations, different versions are tracked and stored by a server system in association with different user accounts. As a result, a user may view, annotate, or share his own version of a document from multiple different devices. Local copies of documents may be stored, annotated, or shared, and these local copies may be synchronized with copies stored by the server system. A document may be closed so that recipients are restricted from changing the structure of the document, for example, they cannot add new interfaces, documents, or interactive elements to the document, although the document may still permit the addition of annotations or the use of controls that the creating user has included. Alternatively, a document may have an open structure so that recipients may append additional elements such as pages, dashboards, etc.

Among the changes that users may be able to make are the addition of annotations, for example, the addition of comments, highlights, graphics, and so on. Similarly, users may be able to apply redactions or deletions. For example, a recipient of a document showing sales data for a region may focus a version of the document on only a portion of a region by reordering or deleting pages and filtering data sets to include data for a particular location in region, so that charts and tables are updated to show the information for the particular location. The user can then pass on the annotated or modified version to other users.

A document may have a state that is persistent for individual users. Current state characteristics can be stored for each user's version of the document, e.g., at a server and/or locally at a user device. As a result, when a user applies filter settings using a control within the document, those settings are retained after the document is closed and reopened, and will be passed on to other users if the user shares the document.

In some implementations, the document is structured as a hierarchy or tree of objects 350a. As illustrated in the figure, the document can have a content root node which is associated an identifier, which will be referred to as a document ID. Interfaces may be defined for the document as, for example, chapters and pages within chapters. The content root node may include information indicating each of the document elements at the next level of the hierarchy, e.g., different chapters. In some implementations, the content root node may include data indicating the structure of the entire tree.

Different levels of the hierarchy 350a may each link to different elements of the document. Examples include a (i) "page node", (ii) a "filters panel stack," and a (iii) "section node." The cover page may provide an initial view or overview of a given level of the hierarchy, e.g., for the document as a whole or a more specific section. The "filters panel stack" represents interactive elements and their settings. Each level of the hierarchy may have associated interactive controls. Some controls, linked to the root node, may act on the entire document, for example, to filter a data source across all chapters and pages. These filters may be considered more of a global filter as they filter across all chapters and pages. Other controls may operate in more limited areas of the document, for example, on specific chapters, pages, regions of pages, or specific elements within pages. These filters may be considered local filters as the filter operates on specific elements. Thus, the behavior of controls can be defined independently for each level of the hierarchy that forms the document. The page node may represent a specific view or user interface. The position of page nodes in the hierarchy indicates the sequence that views are shown to the user.

In some implementations, elements of the document are stored as server objects, for example represented by XML code or other data structures. Each object has a unique identifier, so that the structure of the document can be defined by links between the objects. The overall structure of the document may be fixed by the user that creates the document. Each user that receives the document may have a user identifier assigned.

Annotations or changes that each individual user makes are stored in a separate annotation object or document. For example, a personal view object 360a can be created for each user that annotates or interacts with the document. In fact, the same user can have multiple personal view objects to show different versions of the same document. Personal view object may be created automatically in response to a user's interaction with the document, or manually, such as when the user indicates that his annotations should be saved. Each personal view object 360a, is assigned a unique identifier, as are the other objects in the system. The personal view object 360a includes, for example, the document ID that the object 360a corresponds to, a user ID for the user that created the personal view, and annotations to the original document represented by the hierarchy 350a. The annotations may indicate, for example, state of filters or other controls, added text or graphics, removed areas or sections of the document and so on. In some implementations, individual annotations may be represented as different objects. In an example, the annotation data indicates a portion of the document, in this case, a specific page node, where the annotation is applied, as well as a location in the page and text to be displayed at the location.

When a user shares his version or view of the document, the system sends a reference or link that includes both the document ID and the personal view object ID. This allows the recipient's device to display the master document version and to apply the annotations or other changes indicated by the personal view object of the sender. In this manner, many versions of the document can be circulated with personal annotations, without altering the original version.

Changes to a document by the creating user are automatically propagated to any recipient of the document. Because the document is maintained by the server, each time a user views a document, the server can provide an updated copy of the master version, and then apply any annotations from a personal view object. Changes to personal view objects may also be propagated to others. Because annotations are tied to the personal view object, if User A's personal view object is updated with new annotations, User B's device will obtain the most recent annotations from the personal view object and apply them, even if User A previously shared the document before making the annotations.

In some implementations, users who receive an annotated version of a document may build on the changes indicated in the personal view object with their own personal view object. A personal view object may reference a personal view object of another user. For example, the personal view object for User B may show changes relative to the personal view object of User A, which show changes relative to the master version of the document. Alternatively, User B's personal view object may be decoupled from the personal view object of User A by simply creating a copy of the annotations existing at the time User B's personal view object is created and not referencing the personal view object for User A.

When a creating user creates a document, the server 102 creates a link to each of the documents that the creating user selects for the document. The documents may be a dashboard that includes illustrations of live data sources stored in databases. In instances where the documents include links to live data sources, the document may also include direct links to those data sources. The server 102 may define a hierarchy of the documents in the document according to a structure provided by the creating user. The hierarchy may include chapters that each have their own documents and data sources as well as limitations and permissions selected by the creating user. In some implementations, a different document may include different links to the same live data sources as another document. In this instance, the data of the live data sources does not change based on the document that is accessing the data. The accessing document may capture a snapshot of the data source and operate on the snapshot in instances where some of the data may be manipulated.

Each chapter of a document may include links to multiple dashboards, links to data sources for each of the dashboards, and permissions that are set by the creating user. The permissions may include a list of users who can access the chapter, a list of filters that users can apply to the dashboards or data sources, or a list of the documents or items on each document that users can annotate. Each chapter may also include data related to users who interacted with the chapter. A user may add annotations to documents such as comments or highlighting. In this instance, the server 102 adds data to the chapter to indicate that a particular user added an annotation. A creating user may add a filter to the documents. Similar to the annotation, the server adds data to the chapter to indicate that the user added a filter to the document and identifies the filter applied and the data source to which the filter applies.

Any modifications performed by viewing users do not change the original document. The only changes are to the chapters or documents where the modifications are added. When the server 102 records an annotation or modification by a user, the server 102 may also note the state of the document. The state may include the illustration viewed by the user and the underlying data when the user added the annotation. Because a filter or annotation added by a user may only make sense when the data is in a particular state, the document may add data to the annotation to indicate the state. As an example, a user may make a comment related to sales data. The sales data displayed in the document may be the current sales data such that any viewer of the document views the most recent sales data. A commenting user may leave a comment related to the sales at a particular time. The server may store the state of the sales data along with the user's comment in the annotation added to the document. As noted above, annotations and state of a document may be stored in a personal view object. This means that only users that view the document with that personal view object see the annotations. In other words, although many users may be making annotations to a document, all recipients of the original document will still see the original version without annotations.

The creating user may forward the document to users who may not have access to the underlying data sources or to the application used to access the underlying data sources. In this sense, the document provides a standalone way for a user to access the underlying data sources without the specific credentials used to access the underlying data. When viewing the document, the user can interact with the underlying data but is unable to add new data sources.

Figure 4:
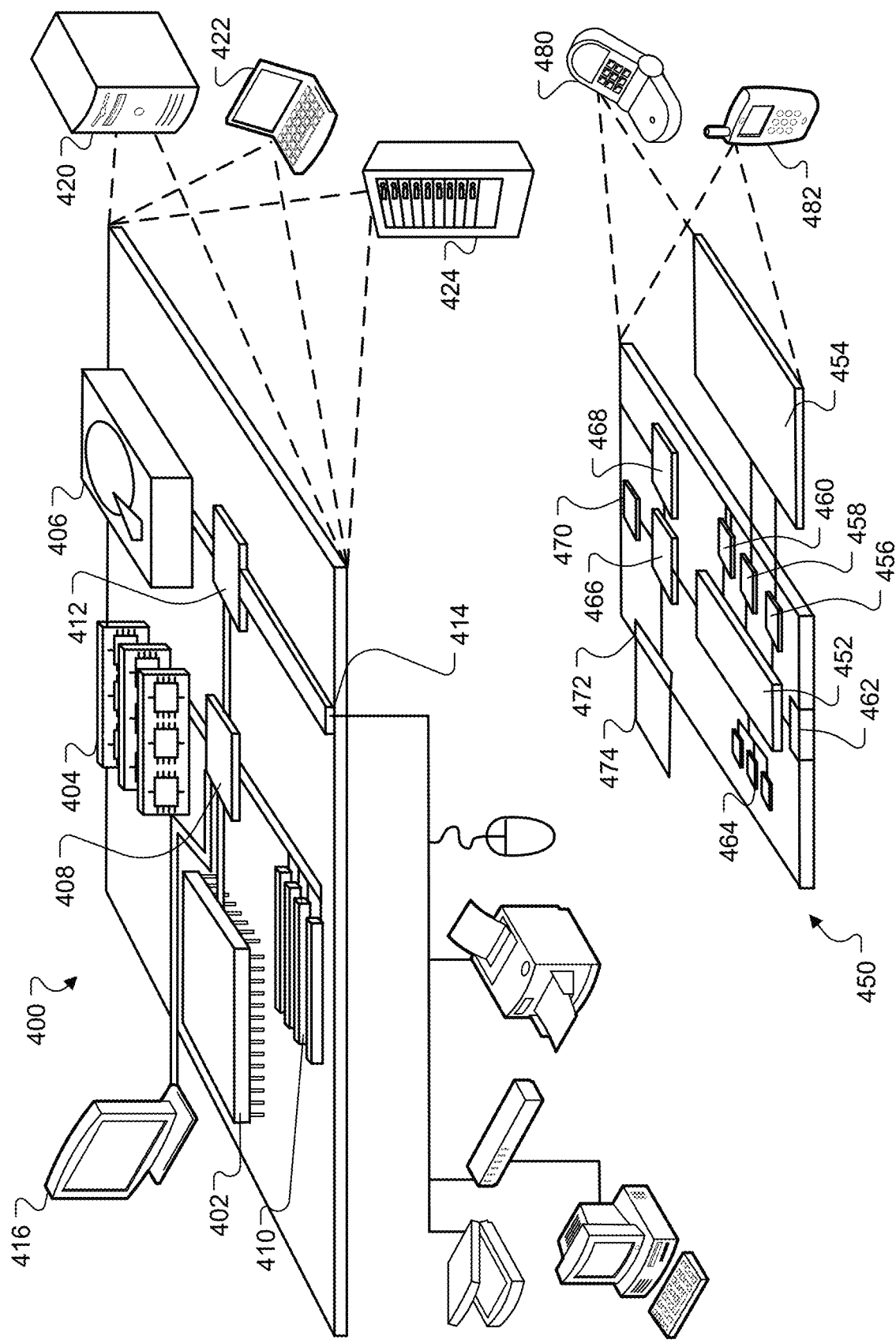
FIG. 4 illustrates an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, wireless (e.g., Bluetooth) headsets, hearing aid, smart watches, smart glasses, activity trackers, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, a microphone, speakers, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a touch-enabled display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
accessing, by one or more computers, document data for an interactive document having content that is adjustable based on geographic locations of objects;
determining, by the one or more computers, one or more object types specified by the document data, the one or more object types indicating types of objects that are discoverable using the interactive document;
obtaining, by the one or more computers, object data that indicates objects of the one or more object types and object location data indicating locations associated with objects;
providing, by the one or more computers, a map of a first geographical area in the interactive document, wherein the map indicates locations of the objects that are associated with locations in the first geographical area;
receiving, by the one or more computers, data indicating a user interaction with the interactive document, wherein the user interaction indicates a user-specified geographical area within the first geographical area;
in response to the user interaction that indicates the user-specified geographical area:
  identifying, by the one or more computers and based on the object location data, a group of objects, wherein each identified object of the group of objects (i) has an object type of the one or more determined object types and (ii) is associated with a location in the user-specified geographical area; and
  updating, by the one or more computers, a view of the document based on the user-specified geographical area;
obtaining, by the one or more computers, attributes of the identified objects from one or more databases;
providing, by the one or more computers, a control in the interactive document to initiate saving of the identified group of objects associated with the user-specified geographical area; and
in response to receiving data indicating user interaction with the control, storing, by the one or more computers, group data identifying the group of objects and the obtained attributes of the identified objects, the group data being stored such that the group data is shareable among multiple computing devices.

2. The method of claim 1, wherein obtaining object location data indicating locations associated with objects comprises:
obtaining, from each object, GPS data that indicates a location associated with an object; or
obtaining, from each object, data communicated over short range radio indicating a location associated with an object.

3. The method of claim 1, wherein types of objects that are discoverable using the document comprise:
a person with a mobile device;
a building; or
a shipping container with a location beacon.

4. The method of claim 1, comprising:
obtaining, by the one or more computers, updated object location data indicating updated locations associated with the objects; and
updating, by the one or more computers, the view of the document based on the updated object location data.

5. The method of claim 1, comprising:
providing, for output, a control that, upon selection, captures the view of the document including the identified group of objects and the obtained attributes;
receiving, at a first time, a selection of the control;
in response to receiving a selection of the control, storing data that identifies the identified group of objects and the attributes of the identified objects at the first time;
receiving, at a second time, a request for the view of the document; and
in response to receiving the request for the view of the document, providing the view of the document based on the identified group of objects and the attributes of the identified objects.

6. The method of claim 5, comprising:
in response to receiving, at the second time, the request for the view of the document,
obtaining, at the second time and by the one or more computers, updated attributes of the identified objects from the one or more databases; and
providing the view of the document based on the identified group of objects and the updated attributes of the identified objects.

7. The method of claim 1, comprising:
based on the identified group of objects and the obtained attributes, generating a filter;
storing the filter that was generated based on the identified group of objects and the obtained attributes;
receiving a request to apply the stored filter to a document; and
in response to receiving the request to apply the stored filter to the document, identifying, by the one or more computers and using the filter, a second group of objects.

8. The method of claim 1, comprising:
aggregating the obtained attributes for identified objects of a same type; and
providing, by the one or more computers, a visualization of the aggregated obtained attributes for the identified objects of the same type, the visualization comprising at least one of a map, chart, or graph.

9. The method of claim 1, comprising:
providing, by the one or more computers, a visualization based on the attributes of the identified objects;
obtaining, by the one or more computers, updated attributes of the identified objects; and
updating, by the one or more computers, the visualization based on the obtained updated attributes.

10. The method of claim 1, comprising:
receiving a request to share the identified group of objects with a particular user; and
in response to receiving the request to share the identified group of objects, providing, to the particular user, (i) the updated view of the interactive document based on the document data, the identified group of objects, and the obtained attributes, and (ii) access to the stored group data identifying the group of objects and the attributes of the identified objects.

11. The method of claim 1, wherein:
identifying the group of objects comprises:
identifying a group of people, wherein each person of the group of people is located in the particular geographical area, and
the method comprises:
providing, for output, a control that, upon selection, initiates communication with the identified group of people.

12. The method of claim 1, comprising:
based on determining the one or more object types specified by the document data, determining, for each type of object, a set of attribute fields by:
transmitting a request for the set of attribute fields for each type of object; and
in response to the request for the set of attribute fields for each type of object, receiving data identifying the set of attribute fields for each type of object; and
in response to determining the set of attribute fields, generating a visualization of the obtained attributes of the identified objects based on the set of attribute fields of the object type of the identified objects.

13. The method of claim 1, comprising:
generating a user interface element for the group of objects, and
in response to selection of the user interface element, updating, by the one or more computers, the view of the document to display an updated map of the first geographical area, wherein the map indicates updated locations of the objects in the group of objects.

14. The method of claim 1, wherein the one or more object types comprise multiple object types, and wherein the method comprises:
receiving, by the one or more computers, data indicating a second user interaction with the interactive document, wherein the second user interaction indicates a user-specified subset of the multiple object types specified by the document data; and
in response to the user interaction that indicates the user-specified subset of the multiple object types, updating, by the one or more computers, a view of the document to designate object having an object type in the user-specified subset.

15. The method of claim 1, wherein the user-specified geographical area is indicated through user interaction with the map.

16. The method of claim 15, wherein the user-specified geographical area is indicated by a user drawing a boundary on the map.

17. The method of claim 1, comprising:
after the interactive document is opened subsequent to storing the group data:

determining that the stored group data corresponds to the interactive document;

updating the map in the interactive document to indicate locations of the objects in the group of objects identified by the group data; and generating a visualization for the interactive document based on attributes of the objects in the group of objects identified by the group data.

18. The method of claim 1, wherein updating, by the one or more computers, the view of the document based on the user-specified geographical area comprises:

filtering a set of objects to obtain a filtered set of objects that are each located in the user-specified geographical area; and updating a visualization in the document to be based on attributes of the objects in the filtered set of objects that are each located in the user-specified geographical area.

19. A system comprising:

one or more computers and one or more storage devices storing instructions that are operable, when executed by the one or more computers, to cause the one or more computers to perform operations comprising:

accessing, by the one or more computers, document data for an interactive document having content that is adjustable based on geographic locations of objects;

determining, by the one or more computers, one or more object types specified by the document data, the one or more object types indicating types of objects that are discoverable using the interactive document;

obtaining, by the one or more computers, object data that indicates objects of the one or more object types and object location data indicating locations associated with objects;

providing, by the one or more computers, a map of a first geographical area in the interactive document, wherein the map indicates locations of the objects that are associated with locations in the first geographical area;

receiving, by the one or more computers, data indicating a user interaction with the interactive document, wherein the user interaction indicates a user-specified geographical area within the first geographical area;

in response to the user interaction that indicates the user-specified geographical area:

identifying, by the one or more computers and based on the object location data, a group of objects, wherein each identified object of the group of objects (i) has an object type of the one or more determined object types and (ii) is associated with a location in the user-specified geographical area; and updating, by the one or more computers, a view of the document based on the user-specified geographical area;

obtaining, by the one or more computers, attributes of the identified objects from one or more databases;

providing, by the one or more computers, a control in the interactive document to initiate saving of the identified group of objects associated with the user-specified geographical area; and in response to receiving data indicating user interaction with the control, storing, by the one or more computers, group data identifying the group of objects and the obtained attributes of the identified objects, the group data being stored such that the group data is shareable among multiple computing devices.

20. A non-transitory computer-readable medium storing software comprising instructions executable by one or more computers which, upon such execution, cause the one or more computers to perform operations comprising:

accessing, by the one or more computers, document data for an interactive document having content that is adjustable based on geographic locations of objects;

determining, by the one or more computers, one or more object types specified by the document data, the one or more object types indicating types of objects that are discoverable using the interactive document;

obtaining, by the one or more computers, object data that indicates objects of the one or more object types and object location data indicating locations associated with objects;

providing, by the one or more computers, a map of a first geographical area in the interactive document, wherein the map indicates locations of the objects that are associated with locations in the first geographical area;

receiving, by the one or more computers, data indicating a user interaction with the interactive document, wherein the user interaction indicates a user-specified geographical area within the first geographical area;

in response to the user interaction that indicates the user-specified geographical area:

identifying, by the one or more computers and based on the object location data, a group of objects, wherein each identified object of the group of objects (i) has an object type of the one or more determined object types and (ii) is associated with a location in the user-specified geographical area; and updating, by the one or more computers, a view of the document based on the user-specified geographical area;

obtaining, by the one or more computers, attributes of the identified objects from one or more databases;

providing, by the one or more computers, a control in the interactive document to initiate saving of the identified group of objects associated with the user-specified geographical area; and in response to receiving data indicating user interaction with the control, storing, by the one or more computers, group data identifying the group of objects and the obtained attributes of the identified objects, the group data being stored such that the group data is shareable among multiple computing devices.

* * * * *